United States Patent [19]

Koch et al.

[11] Patent Number: 4,698,252
[45] Date of Patent: Oct. 6, 1987

[54] COMPOSITE FOAM ARTICLES AND METHOD FOR FABRICATING SUCH ARTICLES

[75] Inventors: G. Teryl Koch, Pataskala; Thomas L. Smith; Keith A. Jacklin, both of Reynoldsburg, all of Ohio; James A. Hammond, Redlands, Calif.

[73] Assignee: Colamco, Inc., Columbus, Ohio

[21] Appl. No.: 720,373

[22] Filed: Apr. 5, 1985

Related U.S. Application Data

[63] Continuation-in-part of Ser. No. 604,005, Apr. 26, 1984, abandoned.

[51] Int. Cl.$^4$ ............... B32B 3/26; B32B 7/12; B32B 31/12
[52] U.S. Cl. ................... 428/159; 156/222; 264/321; 428/316.6; 428/317.1
[58] Field of Search ........... 428/158, 159, 160, 316.6, 428/317.1, 317.7; 156/222, 224; 264/321

[56] References Cited

U.S. PATENT DOCUMENTS

| | | | |
|---|---|---|---|
| 2,999,041 | 9/1961 | Lappala | 428/316.6 |
| 3,213,071 | 10/1965 | Campbell | 428/316.6 |
| 3,306,967 | 2/1967 | Turkewitsch | 264/321 |
| 3,355,535 | 11/1967 | Hain et al. | 428/316.6 |
| 3,535,198 | 10/1970 | Bloom | 428/317.7 |
| 3,562,085 | 2/1971 | Crandal et al. | 428/316.6 |
| 3,647,609 | 3/1972 | Cyba | 428/316.6 |
| 3,654,012 | 4/1972 | Schlager | 428/319.7 |
| 3,755,063 | 8/1973 | Massey et al. | 428/316.6 |
| 4,020,207 | 4/1977 | Alfter et al. | 428/317.7 |
| 4,056,161 | 11/1977 | Allen, Jr. | 181/294 |
| 4,076,878 | 2/1978 | Norby | 428/314.4 |
| 4,541,885 | 9/1985 | Caudill, Jr. | 428/316.6 |

FOREIGN PATENT DOCUMENTS

| | | |
|---|---|---|
| 1415852 | 11/1975 | United Kingdom . |
| 1558249 | 12/1979 | United Kingdom . |
| 2028714 | 3/1980 | United Kingdom . |

*Primary Examiner*—William J. Van Balen
*Attorney, Agent, or Firm*—Blakely, Sokoloff, Taylor & Zafman

[57] ABSTRACT

Composite shaped foam articles of manufacture and method for fabricating such articles is disclosed. The articles are formed by providing a section of foam material, treating a first surface of the section of foam material with adhesive, providing a second section of flexible foam having a surface to be joined with a surface of the first section, treating at least one of the surfaces to be joined with a suitable adhesive, joining the treated surfaces of foam, deforming the joined sections of foam into a selected shape, and curing the adhesives whereby the joined sections of foam remain elastically deformed rather than restoring to their original unstressed condition thus maintaining their selected shape.

26 Claims, 5 Drawing Figures

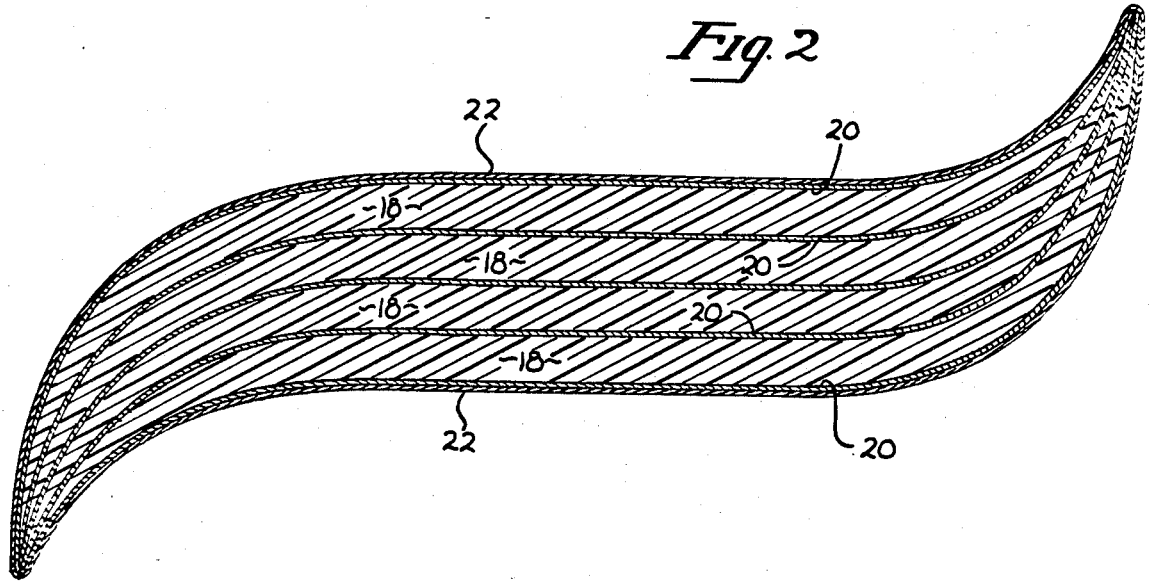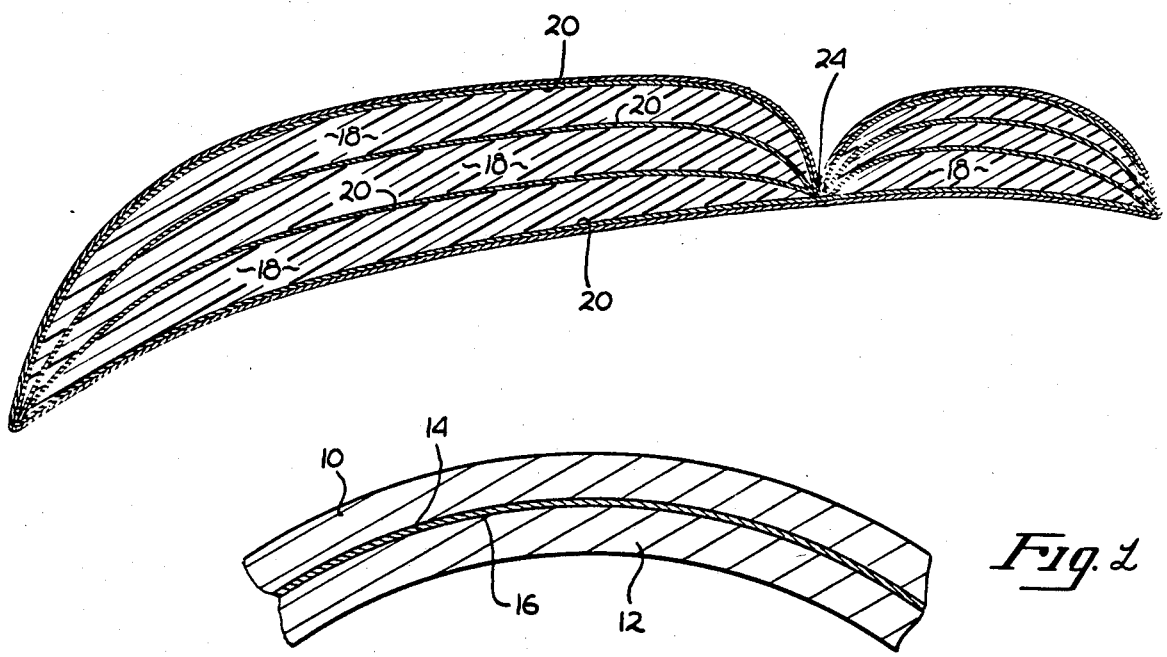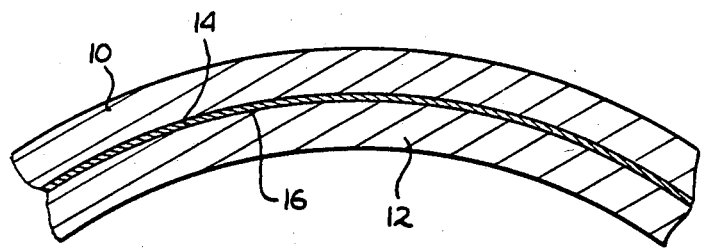

COMPOSITE FOAM ARTICLES AND METHOD FOR FABRICATING SUCH ARTICLES

This is a continuation-in-part of application Ser. No. 604,005 filed Apr. 26, 1984, now abanonded.

BACKGROUND OF THE INVENTION

It is frequently desirable to manufacture articles out of flexible foam materials. In certain applications, such as in the assembly and manufacture of simple, unembossed, rectangular cushions, off-the-shelf foam which can be purchased in any desirable rectangular dimensions, can be used. Flexible foam, however, is elastic. When bent, twisted, or curved, flexible foam will tend to restore to its original shape.

Such foam cannot easily be deformed into a desired shape, such as having arcuate contours and the like. Thus, when an application calls for creating complex non-linear shaped articles, off-the-shelf rectangular foam blocks cannot be used using prior art manufacturing techniques. Rather, in the prior art, the manufacture of such shaped foam articles requires that the flexible foam block be cut, or carved.

For example, to make an article having sharp radii in the prior art, as the radii of the edges of a foam seat cushion, typically a rectangular foam block is provided to service as the cushion's base. Also, a second rectangular block which may be placed atop the first block is carved along its edges to accommodate the sharp, rounded radii of the cushion's edges. The carving of foam in this application is cumbersome and time consuming. Where complex shapes and multiple bends and curves are desirable, carving foam is even more difficult. It typically requires the use of special carving tools, and special skills are required to use these tools. Also, carving adds significantly to the cost and reduces efficiency for the mass production of foam articles.

It is also possible to manufacture flexible foam articles having multiple bends and curves by using molds. Of course, in this case it is not possible to take advantage of the availability of inexpensive off the shelf foam for manufacturing the article. Rather, a foam-forming compound is poured into the mold which has a suitable frame, webs and other design features for incorporation into the flexible foam article shape. This adds considerable expense to the manufacturing process.

SUMMARY OF THE INVENTION

The present invention relates to a method for making three dimensionally shaped articles comprising two or more sections of soft foam. The invention is particularly well suited to taking advantage of the availability of inexpensive, off the shelf foam sheeting for manufacturing complex shapes that otherwise could not be achieved using this type of soft foam. After selecting each suitable section of foam, an intermediate layer of adhesive is coated onto the adjacent surfaces of the sections to be jointed. After the sections are joined, the articles is then manipulated or deformed into a selected shape. While holding the article in this selected shape, the adhesive is cured. Subsequent to curing, the article will maintain its shape rather than resiliently restoring itself to its undeformed position.

While vacuum need not be applied to form the article, it can be used to assist in holding fabric and/or vinyl materials in place during layup and molding. Providing additional layers or sections of flexible foam, and/or by reducing the thickness of the foam sections increases internal resultant forces to further constrain the article from returning to its undeformed condition. This further insures that the article maintains its shape permanently.

It is therefore one object of the invention to provide a method for making shaped foam articles using readily available off the shelf flexible foam material that can be deformed into a desired shape. Other objects and attendant advantages of the present inventive method and articles of manufacture formed thereby will be apparent upon a reading of the detailed description and upon examination of the drawings wherein like reference numerals designate like parts throughout and in which:

DETAILED DESCRIPTION OF THE DRAWINGS

FIG. 1 is a cross sectional view of a two layer, shaped flexible foam article having a contoured shape manufactured in accordance with the present inventive method.

FIG. 2 is a cross sectional view of a multilayered flexible foam article manufactured in accordance with the present inventive method.

FIG. 3 is a sectional view of a multilayered shaped flexible foam article manufactured in accordance with the present invention having a deeply embossed line thereon.

DETAILED DESCRIPTION OF THE INVENTION

Figure 4:
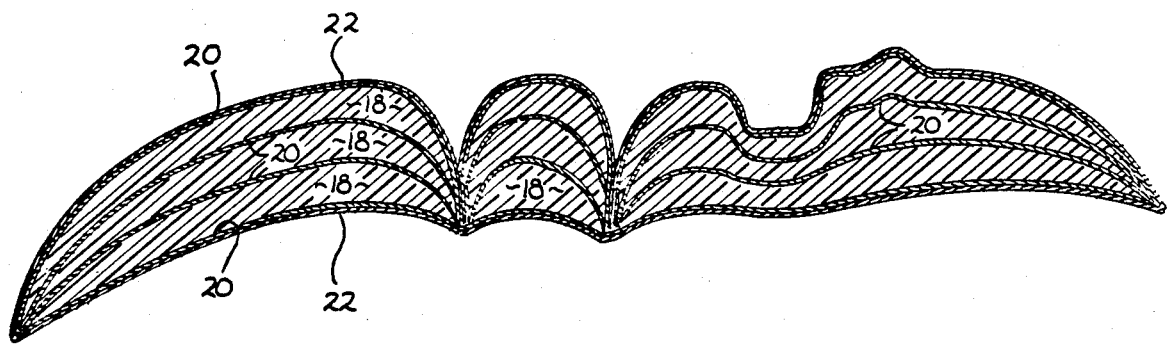
FIG. 4 is a sectional view of a multilayered, shaped flexible foam article with multiple embossing and contours manufactured in accordance with the present inventive method.

The present invention relates to shaped composite foam articles and method for manufacturing such articles. To manufacture a shaped foam article according to the present invented method, with reference to FIG. 1 suitable sections of foam material 10 and 12 are selected. These sections can be rectangular in shape, such as in the nature of readily available off the shelf flexible foam that can be purchased in any foam supply store. The range of densities of flexible foam suitable for use in the present invention is from approximately 0.5 pounds per cubic foot to at least 5 pounds per cubic foot. However, other shapes can be used when available or when suitable to a particular application.

In the embodiment of the invention shown in FIG. 1, the first section 10 and second section 12 of flexible foam material are rectangular layers of off the shelf foam. After selecting the first and second sections of suitable dimensions, at least one of the sections is treated with an adhesive 13 along its surface 14 that will be joined with a surface 16 of the other section. it should be appreciated, however, that to ensure permanent and complete adhesion along the contiguous interface of the adjoining sections, the adjoining surfaces of both sections may be treated with adhesive, or the foam layers can be completely saturated with adhesive. The adhesive that is used may be of either the hard or soft variety as required for a particular application. Suitable hard adhesives include: hard urethane adhesives as described in U.S. Pat. Nos. 4,373,057 and 4,395,530 epoxy adhesives, hard latex adhesives, and the like. Suitable soft adhesives include: soft urethane adhesive as disclosed in the aforesaid patents, soft latex adhesives, contact cements and the like. The surfaces are then joined by applying pressure inwardly to press the surfaces tightly together. The surfaces may be joined and pressed together manually or in hydraulic presses.

Next, the composite multilayered article is deformed along the mating adhesive interface as follows: individual layers are placed sequentially in a suitably contoured mold, after which the mold is closed and the article is held in the mold until the adhesive is cured. Pressure sufficient to form and hold the contours, embossing, etc. is applied during the adhesive curing process.

It should be noted that the shape of the article is not limited by the normally elastic qualities of the flexible foam sections or layers. Thus, a wide variety of contours and shapes can be achieved by plying and bending the article as desired. For example, a simple arcuate contour having a smooth and contiguous curvature is easily accomplished using the present inventive method. Other shapes, such as a horseshoe shape which has a tight radius of curvature, can also be formed. Likewise, L-shapes, S-curves or multiple curves can be achieved. Further, curvature and contour is not limited to bending along a single axis. Rather, three dimensional contours and shapes can be achieved as well.

Once the article is formed into the desired shape, the article is maintained in such shape while the adhesive is cured. For example, if the article is formed into the desired shape by pressing the article into a mold having the desired shape, the article is held in the mold until the adhesive has cured. Thus, when the cured article is removed from the mold, it will retain the desired shape. This is accomplished because compressive and tensile forces created in the foam layers by deformation do not cancel. Rather, a resultant of the compressive and tensile forces generated by bending, stretching and compressing the sections along the adhesive interface provides a resultant force that maintains the deformed shape of the article after curing, rather than allowing the flexible foam to restore to its original unstressed condition.

If necessary, to facilitate forming the article into the desired shape, and/or to speed curing, the article may be heat pressed in the mold according to techniques known to those skilled in the art.

Referring now to FIG. 2, a cross sectional view of an S-shaped composite foam article manufactured in accordance with the present inventive method is shown. It can be seen that the invention is not limited to using only two sections of flexible foam. Shaped articles may also be used using multiple layers, designated throughout by reference numeral 18, with suitable adhesive coatings 20 provided therebetween. Multiple layering further enhances the shape retention characteristics of the article after curing, as does reducing the thickness of the adjacent sections or layers. Further, a cover material 22 can also be adhesively secured to the outer surface of the article as desired for a particular application. Suitable cover materials which can be utilized in the present invention are well known in the art and include woven and non-woven fabrics, vinyls, other pliable plastic films (or sheets), leather and the like. The same adhesive used to join the flexible foam sections together can be used to secure the cover material to the surface of the foam article, or any other suitable adhesive known to those skilled in the art can be utilized. Of course, if necessary, the cover material can be attached to the article by heat pressing the cover to the article while the article is being heat pressed in a mold.

Using the present inventive method, additional features may be simultaneously incorporated into the multilayered foam article. Thus, as shown in FIG. 3, a hinge or bend line 24 can be formed by deeply embossing a line into the article at a selected location thereon, such as to provide a different design emphasis. Such bend lines can be formed by pressing steel rules onto the surface of the article at desired locations and to desired depths.

Decorative patterns may also be incorporated into the shape of the article such as shown in FIG. 4. In this embodiment of the present invention, designs and decorative patterns such as multiple bend lines 24 and contour 25 are embossed and contoured using steel rules in combination with bending and deformation provided manually, or through the use of molds or mechanical frames and bending equipment as an additional process step.

Figure 5:
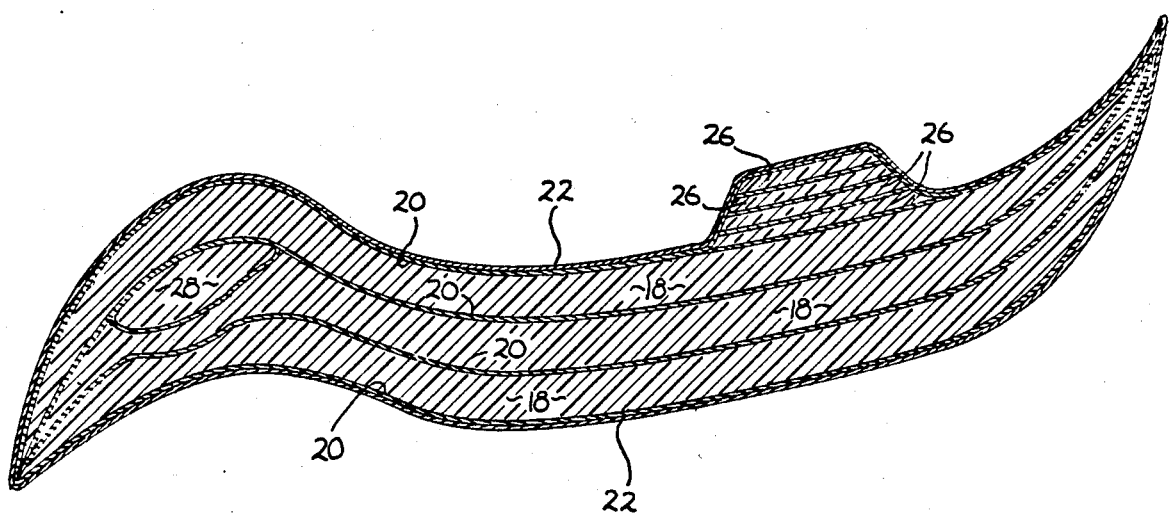
FIG. 5 is a sectional view of a multilayered shaped flexible foam article incorporating additional sheets and inserts of flexible foam manufactured in accordance with the present inventive method.

Also, as shown in FIG. 5, additional multiple sheets of flexible foam 26 and inserts such as insert 28 may be incorporated into the article to provide additional design emphasis and/or to provide further padding for comfort.

In another alternative embodiment of the present invention, a shaped article may be molded into a rigid shell made of, for example, ABS plastic or fiberglass. An adhesive layer is then placed between the article and the shell, bonding the two together. The rigid material may be disposed between two or more sections of the composite article to provide a rigid support structure which serves to further maintain the desired shape of the article.

It will be appreciated that other features for support and design enhancement can be incorporated in various embodiments of the articles made in accordance with the present inventive method. These include webbing, the incorporation of spring forms, stiff foam, hard inserts, additional foam, meshed material, cloth or wadding between foam layers or on top of them.

It will also be appreciated that the article can be made with a variety of contour features and layers, with each layer of the article having either similar or divergent contour. A mold to shape the article can be constructed so as to include various embossing tools such as die tools, photoetched plates, wire patterns and the like. Thus, a selected design can be formed in a cover or backing material simultaneously with the molding and curing of the articles. The molds can also be constructed to incorporate thermal adhering devices such as decals or trim in appropriate position during curing. Articles manufactured in accordance with the present inventive method may also be made using vacuum-forming type molds so that additional depth of contour or clarity of an embossed design can be achieved. Using a vacuum forming mold also permits cover materials that are either thick or more difficult to form and heavier backing materials (such as ABS shells) to be used.

Additionally, if desired, one or more of the foam layers and/or the adhesives can be modified to provide additional desirable characteristics to the finished product. Such desirable characteristics include improved sound insulation, resistance to combustion and providing a different feel to the finished product. Thus, by including one or more additives such as acoustical modifiers, fire retardants, smoke reducing agents and substances to alter the surface and bulk characteristics of the foam, the characteristics of the finished product can be changed as desired.

In particular, acoustical modifiers can be added to the adhesive during the manufacturing process. Representative substances suitable for such purpose include alumina (bauxite), magnesium carbonate, lead powder and other materials of high density. The precise quantities to be added are not critical and depend mainly upon the desired level of sound insulation desired. It is preferable that the materials of high density be added to the adhesives rather than to the foam as such substances tend to be abrasive and can cause the foam to tear during the manufacturing process.

Regarding fire retardants, representative fire retardants which may be incorporated in the foam are liquid fire retardants such as tricresyl phosphate and Fyrol CEF made by Stauffer Chemical. Such materials are added to the foam by placing the material on rollers and running the foam through the rollers until the liquid is distributed and dissolved uniformly throughout the foam. Again, the quantities are not critical and depend upon the desired end result.

If it is desired that solid fire retardants be used such as antimony oxide plus halogenated hydrocarbon such as dechlorane, such components can be mixed into the adhesive during the manufacturing process as was the case with the acoustical modifiers noted above. Again, the quantity of solid fire retardant to add is not critical and generally depends upon the desired end use for which the product is being made.

Appropriate smoke reducing agents include alumina plus calcium hydroxide mixed into the adhesive such that the mixture is approximately 300%, by weight of the foam and the ratio of alumina to calcium hydroxide is approximately 3:1 to 4:1.

If it is desired that the surface and bulk characteristics of the foam be altered, for example, to give the foam a rubbery feel, urethane elastomers can be applied to the foam using rollers. A suitable combination for such purpose would be 100 parts of Mobay's Multranol 3901 to 9 parts of Upjohn's Isonate 143 L mixed together and applied to the foam such that it is between approximately 50% and 300% by weight, of the foam. The elastomer is applied to the foam by coating the surface of the foam with the elastomer material by running the foam through rollers coated with the elastomer.

The advantages of including such additives as set forth above are that only one grade of foam needs to be stocked. Ordinarily, when it is desired to produce products having different characteristics, an inventory must be maintained of different types of foam having the characteristics of desired finished products. According to the present invention however, foam can be tailored to specific needs without waiting for suppliers to manufacture a custom batch of foam and/or ship the same. The substrate foam can have a uniform tensile and tear strength which may be greater than the custom formulated foams attached to the substrate. For example, the special combustion modified low-level smoke foams usually do not have a sufficiently high tensile strength to survive normal coating and fabrication procedures. Additionally, by using the disclosed method, several different modifiers can be applied in one, or more successive steps. In this manner, it is possible to incorporate materials which may not be compatible with one another.

It will be appreciated that other embodiments, materials, designs and steps may be incorporated into the present inventive method and articles without departing from the spirit and scope of the invention.

Having described the invention, what is claimed is:

1. A method for forming multi-layered shaped foam articles which retain their shape without the need for a cover material, said method comprising the steps of:
   (a) providing a section of flexible foam material;
   (b) treating a first surface of said section of foam material with adhesive;
   (c) providing a second section of flexible foam having a first surface to be joined with a surface of said first section;
   (d) treating at least one of said surfaces to be joined with a suitable adhesive;
   (e) joining said treated surfaces of foam into a selected shape;
   (f) deforming the joined sections into a selected shape;
   (g) curing said adhesive;
   (h) performing steps (a)–(g) at room temperature;
   whereby said joined sections of foam remain elastically deformed thereby maintaining their selected shape.

2. The method as claimed in claim 1 further comprising between the steps of (e) and (f) the steps of providing at least one additional section of flexible foam having a surface to be joined with a second surface of said second section of flexible foam, treating said surface of said additional section of flexible foam with said suitable adhesive and joining said second section and said additional section, wherein further reinforcement is provided to permanently maintain said multilayer shaped article in a selected post deformation shape.

3. The method as claimed in claim 1 wherein the steps of deforming said joined sections and curing said adhesive comprises the steps of:
   placing the composite article in a suitable mold; and curing said adhesive in said mold.

4. The method as claimed in claim 3 further comprising the step of heat-pressing said article in said mold.

5. A method of making a multilayered shaped foam article as claimed in claim 4 providing the additional steps of:
   providing a cover material for covering the surface of said composite article;
   treating said cover material with an appropriate adhesive;
   applying said cover material to said composite article; and
   simultaneously heat-pressing said cover to said article during the step of heat-pressing said article in said mold.

6. The method as claimed in claim 2 comprising the additional step of placing a meshed material between two adjacent sections of said composite article at least one location between said sections for providing additional support for said multilayered shaped foam article.

7. The method as claimed in claim 4 comprising the additional step of securing attachment fixtures to said composite article for enabling said article to be attached or secured to a support member.

8. The method as claimed in claim 2 comprising the additional step of placing a substantially rigid material between at least two sections of said composite article for providing a rigid support structure for further maintaining the selected shape of said article.

9. The method as claimed in claim 8 wherein said substantially rigid material comprises ABS plastic.

10. The method as claimed in claim 8 wherein said material comprises fiberglass.

11. The method as claimed in claim 1 further comprising the step of adding at least one acoustical modifier to the adhesive prior to treating said surfaces to be joined by said adhesive.

12. The method as claimed in claim 11 wherein said acoustical modifier is selected from the group consisting of alumina, magnesium carbonate and lead powder.

13. The method as claimed in claim 1 further comprising the step of adding a fire retardant.

14. The method as claimed in claim 13 wherein said fire retardant is a liquid fire retardant incorporated in the foam by placing the fire retardant on rollers and running the foam through the rollers to thereby apply the fire retardant to the foam.

15. The method as claimed in claim 14 wherein said liquid fire retardant comprises tricresyl phosphate.

16. The method as claimed in claim 13 wherein said fire retardant is a solid fire retardant mixed into the adhesive prior to treating said surfaces to be joined by said adhesive.

17. The method as claimed in claim 14 wherein said solid fire retardant is selected from the group consisting of antimony oxide plus a halogenated hydrocarbon.

18. The method as claimed in claim 1 further comprising the step of adding a smoke reducing agent to the adhesive prior to treating said surfaces to be joined by said adhesive.

19. The method as claimed in claim 18 wherein said smoke reducing agent is alumina plus calcium hydroxide in the ratio of approximately 3:1 to 4:1 of alumina to calcium hydroxide.

20. The method as claimed in claim 1 further comprising the step of applying a urethane elastomer to the foam to alter the surface and bulk characteristics thereof.

21. The method as claimed in claim 20 wherein said urethane elastomer is applied to the surface of said foam by running the foam through rollers coated with the urethane elastomer.

22. A method of forming multilayered shaped foam articles which retain their shape without the need for a cover material, said method comprising the steps of:
(a) providing multiple layers of resilient foam;
(b) treating the surfaces of said layers with a suitable adhesive;
(c) joining said adhesive-treated sections;
(d) deforming the composite multilayered article such that the shape of said article is defined by at least one arcuate contour;
(e) curing said adhesive thereby adhesively securing adjacent layers of resilient foam;
(f) performing steps (a)-(e) at room temperature
whereby said composite article maintains its deformed shape rather than resiliently restoring to the original unstressed condition.

23. A foam composite article comprising:
(a) a first flexible foam section;
(b) a second flexible foam section having the same properties as said first foam section, said second foam section having at least one surface which conforms to the surface contour of a surface of said first foam section for being adhesively joined into a unitary article;
(c) adhesive means disposed at room temperature between said surfaces to be joined for adhesively securing said first and said second foam sections together without the use of a cover material,
whereby said sections are maintained in a permanently elastically deformed condition.

24. The foam composite article as claimed in claim 23 wherein the shape of said article is defined by at least one arcuate contour.

25. The foam composite article as claimed in claim 24 further comprising a flexible cover material adhesively secured to the surface of said article.

26. The foam composite article as claimed in claim 25 further comprising embossing on selected portions of the surface of said article.

* * * * *